Patented Aug. 7, 1928.

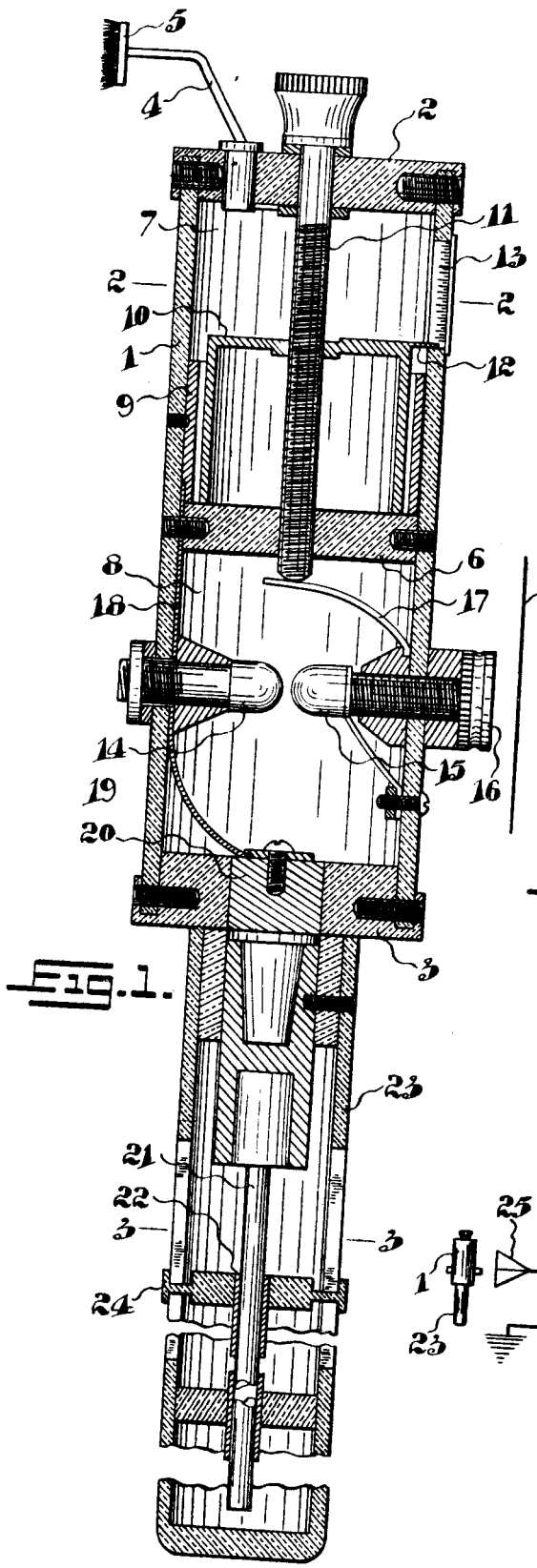

1,679,397

UNITED STATES PATENT OFFICE.

THOMAS DUDLY BERRY, OF MARKDALE, ONTARIO, CANADA.

DEVICE FOR LOCATING DEFECTIVE INSULATORS IN ELECTRIC POWER LINES.

Application filed June 24, 1926. Serial No. 118,297.

It is necessary from time to time to inspect insulators of power lines for the purpose of locating defective or damaged insulators. It has been usual to shut off the power and then have linemen climb the poles or towers and inspect the insulators visually or by tapping the same. This method is slow as well as more or less dangerous for the lineman, and there is further the added objection of interfering with the service through the shutting off of the power.

Lately an instrument has been tried out which is used by engaging it with the insulator, which instrument is adapted to give audible indication of a power leak through the insulator.

This instrument, however, requires to be adjusted before starting out on the day's work by testing it on a good and a bad insulator of the same kind. However, as insulators of different kinds are employed, and only insulators of the kind for which the instrument is adjusted can be satisfactorily tested, it is necessary to return to the base and re-adjust the instrument and again go over the ground.

Further, it is found that atmospheric conditions, such as the amount of moisture in the air, have an important bearing in the adjustment of the instrument, and, therefore, for example, a setting of the instrument made early in the morning when the dew is on the ground will not give the same results later on in the day when the sun is shining brightly. This is due mainly to the different characteristics of the insulators due to the varying humidity.

It will be seen therefore that the instrument referred to will, if adjusted for a particular case, indicate whether an insulator is defective or not, but it is not satisfactory for general use on account of the changing atmospheric conditions and on account of the different types of insulators used on a power line.

My object therefore is to devise an instrument for locating defective insulators which may be adjusted on the spot, to suit the different atmospheric conditions met with in the course of the day, and which may also be adjusted on the spot as different types of insulators are encountered and which may also be adjusted on the spot to suit the different line voltages encountered.

A further object is to devise means whereby the leakage may be detected, rectified and amplified into audible sounds by my instrument which sounds may be heard in the open at some distance from the insulator itself and without the use of ear phones as used with the instrument above referred to.

I attain my object by means of the constructions hereinafter described and illustrated in the accompanying drawings in which:

Fig. 1 is a longitudinal section through my detector;

Fig. 2 a section on the line 2—2 in Fig. 1;

Fig. 3 a section on the line 3—3 in Fig. 1; and

Fig. 4 a diagrammatic view illustrating rectifying and amplifying the electrical disturbance in the detector created by the leakage of an insulator.

In the drawings like numerals of reference indicate corresponding parts in the different figures.

My improved detector comprises a cylindrical casing 1 of insulating material having a head 2 and a base 3. Connected with the head 2 is the arm 4 which carries a wire brush 5 which is adapted to be contracted with the insulator to be tested. The interior of the casing 1 is divided by means of a partition 6 into two chambers 7 and 8. Within the chamber 7 is positioned a variable condenser comprising a stationary member 9 and a movable member 10. This movable member is actuated by means of a threaded stem extending through the head 2, which stem is in electrical contact with the arm 4. The movable member is provided with a pointer 12 extending through a slot 13 in the side of the casing 1. The casing is provided with a suitable scale with which the pointer 12 co-operates.

Supported in the chamber 8 are the spark gap posts 14 and 15, preferably having rounded ends. The terminal 14 is stationary, while the terminal 15 is provided with a micrometer adjustment controlled by means of the knob 16, which is provided with a suitable scale, so that a fine adjustment of the spark gap terminals relative to one another may be obtained. The movable terminal 15 is in electrical contact with the stem 11. through the spring 17, while the stationary terminal 14 is connected by means of the member 18 with the stationary member 9 of the condenser, and also connected by the member 19 with the member 20 carried by the base 3.

Detachably and electrically connected with the member 20 is the adjustable field slide, which comprises two members 21 and 22 adjustable longitudinally relative to one another, which members are mounted within a casing 23 of insulating material. The member 22 is actuated by means of an adjusting member 24 which extends through a slot in the casing 23, the casing adjacent the slot being provided with a suitable scale with which the adjusting member co-operates. A suitable handle of any convenient length will be secured to the casing 23.

Preferably an instrument in the nature of a hygrometer is used in conjunction with the apparatus above described, which instrument is adapted to indicate the moisture condition of the air, and the practice will be to keep a record of the settings of the condenser, spark gap posts and adjustable field slide at which the instrument is most efficient for given atmospheric conditions. Once the settings have been recorded for a given atmospheric condition it is only necessary to refer to the scale and the detector may be set accordingly.

It will be evident, of course, that the adjustments may be recorded for each type of insulator, and a complete chart may be made giving the necessary information for all types of insulators used, as well as for all ordinary atmospheric conditions.

The detector is used as follows. Having consulted the records for the settings suitable for the particular type of insulator to be tested in view of the atmospheric conditions then existing, the condenser, spark gap and adjustable slide field are set accordingly, the brush 5 is contacted with the insulator. If the insulator is porous or cracked and there is a power leak, the current passes down the arm 4 and stem 11 to the movable member 10 of the condenser and to the movable post 15 of the spark gap. The condenser and spark gap are so adjusted that the larger part of the current will have a tendency to jump the spark gap rather than pass through the condenser. The jumping of the current from post 15 to the post 14 will set up an electrical disturbance.

To rectify this electrical disturbance into an audible signal and amplify same so that it may be heard at a distance I use in conjunction with the detector amplifying apparatus which may be of a type as used in wireless receiving sets in conjunction with a loud speaker, but as signals such as made audible by the detector are usually audible at any setting of radio receiving apparatus, certain parts as ordinarily used in receiving sets for tuning purposes may be omitted. A suitable circuit is illustrated in Fig. 4 of the drawings.

25 is an antenna, which is positioned close to the detector where it may be affected by the disturbance caused in the detector by leakage from a defective insulator. The antenna is connected in a circuit A in which is located a fixed condenser 26 and a fixed coil 27, and which circuit is also grounded. A second circuit B contains a fixed coil 28, a grid leak 29, a grid condenser 30, an audion 31, a loud speaker unit 32, a rheostat 33 controlling the filament 34 of the audion and the usual A and B batteries 35, 36. The fixed coil 28 is, of course, in inductive relation with the coil 27. While the current supplied to the filament 34 is, of course, controlled by the rheostat 33, it is very important that the signals be amplified to the same extent under all conditions, and I find it desirable therefore to include in the amplifying circuit means for indicating the current supplied to the filament 34 by the A battery 35 and I therefore include in the lead from the battery to the filament an ammeter or other indicator 37. With this inclusion of the indicator 37 in the circuit, I am enabled to maintain a constant condition in the amplifying circuit, and therefore the signals created in the detector will be amplified always to the same extent.

Various changes in the details of construction of my detector and in my amplifier may, of course, be made without departing from the spirit of my invention.

What I claim is:

1. In apparatus for locating defective insulators in electric power lines, the combination of a body member; spaced terminals carried by said body member and forming between them a spark gap; a member adapted to be contacted with an insulator in electrical connection with one of said terminals; a rod of conducting material in electrical connection with the other terminal, and adapted to cross the electrostatic field adjacent the insulator being tested; and a variable condenser in parallel with said spark gap.

2. In apparatus for locating defective insulators in electric power lines, the combination of a body member; spaced terminals carried by said body member and forming between them a spark gap; a member adapted to be contacted with an insulator in electrical connection with one of said terminals; and a rod of conducting material in electrical connection with the other terminal, and adapted to cross the electrostatic field adjacent the insulator being tested, said rod being formed of two parts adapted to be telescoped on one another to vary its length.

3. In apparatus for locating defective insulators in electric power lines, the combination of a body member; spaced terminals carried by said body member and forming between them a spark gap; a member adapted to be contacted with an insulator in electrical connection with one of said terminals; a rod of conducting material in electrical connection with the other terminal, and adapted to cross the electrostatic field adjacent the insulator being tested, said rod being formed of two parts adapted to be telescoped on one another to vary its length; and a variable condenser in parallel with said spark gap.

4. In apparatus for locating defective insulators in electric power lines, the combination of a body member; spaced terminals carried by said body member and forming between them a spark gap; a member adapted to be contacted with an insulator in electrical connection with one of said terminals; a tubular handle of insulating material connected with said body member; and a rod of conducting material in said handle, said rod being in electrical connection with the other terminal and adapted to cross the electrostatic field adjacent the insulator being tested.

5. In apparatus for locating defective insulators in electric power lines, the combination of a body member; spaced terminals carried by said body member and forming between them a spark gap; a member adapted to be contacted with an insulator in electrical connection with one of said terminals; a tubular handle of insulating material connected with said body member; and a rod of conducting material in said handle, said rod being in electrical connection with the other terminal and adapted to cross the electrostatic field adjacent the insulator being tested, said rod being formed of two parts adapted to be telescoped on one another to vary its length, said rod having a projection thereon and said handle having a slot formed therein through which the projection extends.

6. In apparatus for locating defective insulators in electric power lines, the combination of a tubular casing having closed ends; a partition dividing said casing into upper and lower compartments; a threaded stem extending through one end of the casing through the upper compartment and through the partition; a contact member extending from said end of the casing and in electrical connection with said stem; a stationary condenser member in said upper compartment; a movable condenser member mounted on and adapted to be actuated by said stem; spaced terminals in the lower compartment and forming between them a spark gap, one of said terminals being in electrical communication with the said stem; and a rod of conducting material in electrical connection with the other terminal and adapted to cross the electrostatic field adjacent the insulator being tested.

7. In apparatus for locating defective insulators in electric power lines, the combination of a tubular casing having closed ends; a partition dividing said casing into upper and lower compartments; a threaded stem extending through one end of the casing through the upper compartment and through the partition; a contact member extending from said end of the casing and in electrical connection with said stem; a stationary condenser member in said upper compartment; a movable condenser member mounted on and adapted to be actuated by said stem; spaced terminals in the lower compartment and forming between them a spark gap, one of said terminals being in electrical communication with the said stem; a rod of conducting material in electrical connection with the other terminal and adapted to cross the electrostatic field adjacent the insulator being tested; and a casing of insulating material enclosing said rod and forming a handle for the apparatus.

8. In apparatus for locating defective insulators in electric power lines, the combination of a tubular casing having closed ends; a partition dividing said casing into upper and lower compartments; a threaded stem extending through one end of the casing through the upper compartment and through the partition; a contact member extending from said end of the casing and in electrical connection with said stem; a stationary condenser member in said upper compartment; a movable condenser member mounted on and adapted to be actuated by said stem; spaced terminals in the lower compartment and forming between them a spark gap, one of said terminals being in electrical communication with the said stem; and a rod of conducting material in electrical connection with the other terminal and adapted to cross the electrostatic field adjacent the insulator being tested, said rod being formed of two parts adapted to be telescoped on one another to vary its length.

9. In apparatus for locating defective insulators in electric power lines, the combination of a tubular casing having closed ends; a partition dividing said casing into upper and lower compartments; a threaded stem extending through one end of the casing through the upper compartment and through the partition; a contact member extending from said end of the casing and in electrical connection with said stem; a stationary condenser member in said upper compartment; a movable condenser member mounted on and adapted to be actuated by said stem; spaced terminals in the lower compartment and forming between them a spark gap, one of said terminals being in electrical communication with the said stem; a rod of conducting material in electrical connection with the other terminal and adapted to cross the electrostatic field adjacent the insulator being tested, said rod being formed of two parts adapted to be telescoped on one another to vary its length, said last mentioned casing being slotted and the movable portion of said rod having a projection thereon extending through said slot.

Signed at Markdale this 13th day of May, 1926.

THOMAS DUDLY BERRY.